(12) United States Patent
Nageli

(10) Patent No.: US 7,316,760 B2
(45) Date of Patent: Jan. 8, 2008

(54) PROCESS FOR MANUFACTURING A LAMINATE

(75) Inventor: Hans-Rudolf Nageli, Neuhausen (CH)

(73) Assignee: Alcan Technology & Management Ltd., Neuhausen am Rhienfall (CH)

( * ) Notice: Subject to any disclaimer, the term of this patent is extended or adjusted under 35 U.S.C. 154(b) by 0 days.

(21) Appl. No.: 11/511,298

(22) Filed: Aug. 29, 2006

(65) Prior Publication Data

US 2007/0051466 A1    Mar. 8, 2007

(30) Foreign Application Priority Data

Sep. 7, 2005  (EP) .................................. 05405525

(51) Int. Cl.
C09J 5/00   (2006.01)

(52) U.S. Cl. .................. 156/324; 156/331.7; 156/332; 156/310; 427/407.1; 427/420

(58) Field of Classification Search ................ 156/324, 156/331.7, 332, 310, 315; 427/407.1, 409, 427/411, 412.1, 420
See application file for complete search history.

(56) References Cited

U.S. PATENT DOCUMENTS

| | | |
|---|---|---|
| 4,791,004 A | 12/1988 | Suzuki et al. |
| 4,994,310 A | 2/1991 | Frisk et al. |
| 5,133,999 A | 7/1992 | Lofgren et al. |
| 6,503,620 B1 * | 1/2003 | Xie et al. .................... 428/354 |
| 6,845,599 B2 | 1/2005 | Berlin et al. |

FOREIGN PATENT DOCUMENTS

| | | |
|---|---|---|
| EP | 0318771 | 11/1988 |
| EP | 0423511 | 9/1990 |
| EP | 0586843 | 7/1993 |
| EP | 1416088 | 5/2004 |
| WO | 99/46121 | 9/1999 |
| WO | 01/54828 | 8/2001 |

* cited by examiner

*Primary Examiner*—Jeff H. Aftergut
*Assistant Examiner*—Michael A Tolin
(74) *Attorney, Agent, or Firm*—Fisher, Christen & Sabol

(57) ABSTRACT

In a process involving at least two film-shaped substrates (44, 46) bonded together by means of at least one adhesive layer containing a catalyst which accelerates hardening of the adhesive, a first substrate (44) is coated with a liquid film comprising three layers viz., two adhesive layers (34, 38) and an intermediate layer (36), which is situated between the adhesive layers (34, 38) and contains a catalyst (37), using liquid film coating in the form of curtain coating or slide-coating and subsequently bonded onto the second substrate (46). The laminate (48) formed may be coated via at least one liquid film coating with a further three layer liquid film comprising two adhesive layers (134, 138) and an intermediate layer (136), which is situated between the adhesive layers (134, 138) and contains a catalyst (137), using curtain coating or slide-coating and subsequently bonded onto at least one additional substrate (50) to form an additional laminate (52). Using that process the hardening time for the adhesive coatings can be drastically reduced.

23 Claims, 3 Drawing Sheets

PROCESS FOR MANUFACTURING A LAMINATE

Figure 1:
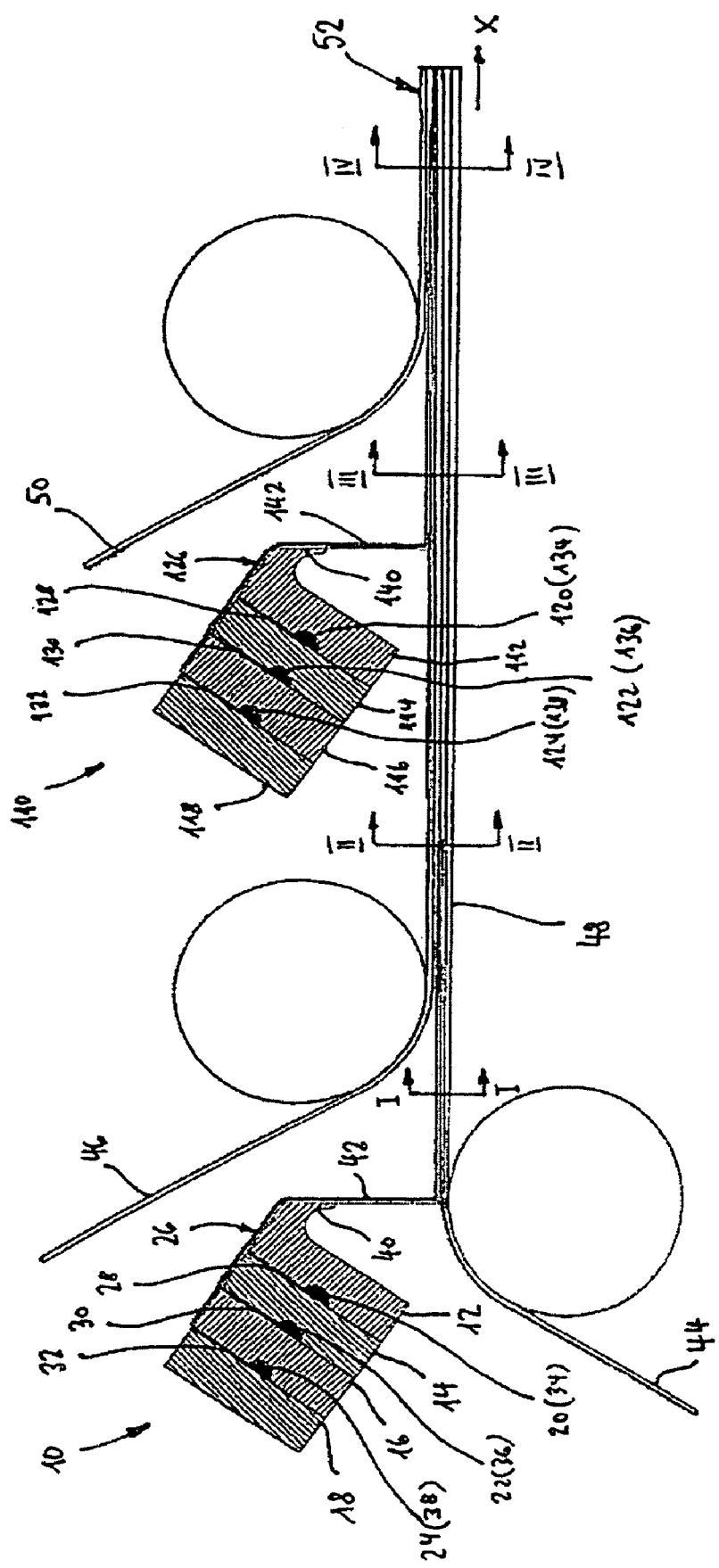

This U.S. application has priority benefit of European Patent Application No. 05405525.6, filed on Sep. 7, 2005.

The invention relates to a process for manufacturing a laminate having at least two film-type substrates that are joined together via an adhesive which hardens fast with the aid of a catalyst.

One of the greatest problems in the packaging industry is the long time that the currently most frequently used polyurethane-based adhesive systems require to harden. Unsuccessful attempts have already been made to solve this problem by working into the plastic film that has to be bonded or spraying a catalyst onto the strips to be bonded.

A liquid film coating method known as "curtain coating", has been used for decades for the production of multi-layer photographic films and papers. In that coating process several layers are deposited simultaneously onto a moving strip of material from a slit-shaped nozzle in the form of a free-fall curtain.

It has also already been proposed to employ the curtain coating method for coating paper and for manufacturing composite laminated material.

In WO 01/54828 A a method for manufacturing a multi-layered packaging laminate having at least two superimposed layers, in which process two or more layers are deposited by curtain coating on an—if desired already coated—substrate of paper, cardboard or plastic film and subsequently dried. The liquid film coatings comprise adhesive layers, barrier layers, intermediate layers as spacers, oxygen-scavenger layers and hot-sealing layers.

Known from U.S. Pat. No. 6,845,599 is a liquid film coating process called "slide coating" which is an alternative to the curtain coating method. In this slide-coating process several layers are deposited simultaneously from a slit-shaped nozzle from a nozzle slide surface directly onto a substrate passing the exit edge of the nozzle slide surface.

The object of the invention is to provide a process of the kind mentioned at the start, by means of which the disadvantages of reduced pot time and the difficult handling of the catalyst can be eliminated.

That objective is achieved by way of the invention in that a first substrate is coated with a liquid film comprising three layers viz., two adhesive layers and an intermediate layer—situated between the adhesive layers and containing a catalyst—using liquid film coating in the form of curtain coating or slide-coating and subsequently bonded onto the second substrate.

The resulting laminate may, by means of curtain coating or slide coating, be coated with at least one further liquid film coating in the form of three layers, viz., two adhesive layers and an intermediate layer containing a catalyst situated between the adhesive layers, and subsequently bonded to at least one additional substrate to form a laminate.

By incorporating the catalyst in the intermediate layer the two plastic layers do not come into contact with the catalyst until the intermediate layer emerges from the nozzle arrangement. The disadvantages of a reduced pot time and difficulty of handling are eliminated by the process according to the invention, and the hardening time for the adhesive systems, in particular the urethane based types of adhesive systems, can be drastically reduced.

Each of the adhesive layers is functionally optimized on the surface of the neighbouring substrates. The formulation of adhesive—specifically selected with respect to a particular substrate—is often an expensive product. The thickness of adhesive layer is, therefore, preferably less than the thickness of the intermediate layer. The thickness of the adhesive layer is usefully about 1 to 30%, preferably 1 to 10% of the thickness of the intermediate layer.

The intermediate layer containing the catalyst is preferably made of a cost favorable material such as a urethane-based adhesive, in particular a standard urethane-based adhesive such as aromatic or aliphatic iso-cyanate. A suitable catalyst is e.g. Caprolactam.

Lewis-bases or Lewis-acids, alkaline salts organic acids and phenols may also be employed as catalysts for polyurethane type adhesives, combinations of these substances and further catalysts may be employed. A list of possible catalysts for polyurethane adhesives is presented e.g. in EP-A-0 586 843.

The layers of adhesive may e.g. be urethane-base adhesives e.g. polyether-based, polyester-based, polybutadiene-polyole-based, acrylic-based or epoxy-based or made up of combinations of the mentioned adhesives.

The layers of liquid film may be solvent-based, solvent-free or water-based. Solvent-free coating fluids are preferred as the usual drying step is not necessary with these fluids.

Substrates used for coating may be plastic films e.g. of polyethylene-terephthalate (PET), polyethylene (PE), polypropylene (PP), polyamide (PA), metal foils such as aluminum foils, possibly coated e.g. with SiOx, paper or a combination of at least two of the materials mentioned.

Figure 2:
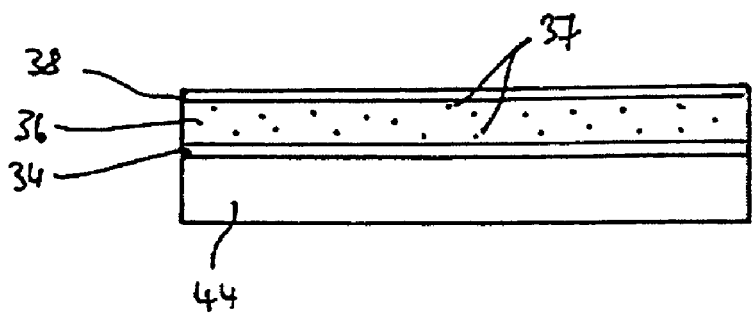
Figure 3:
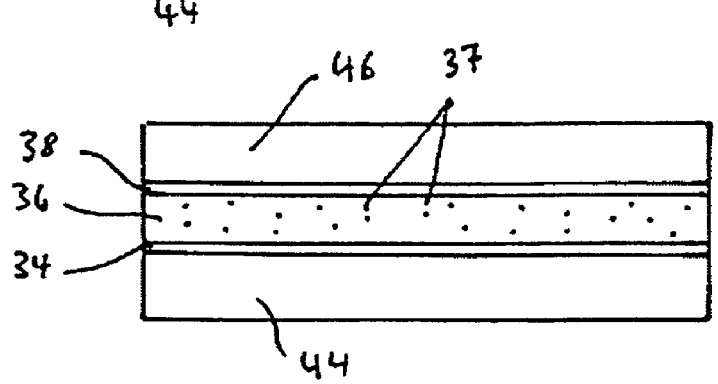
Figure 4:
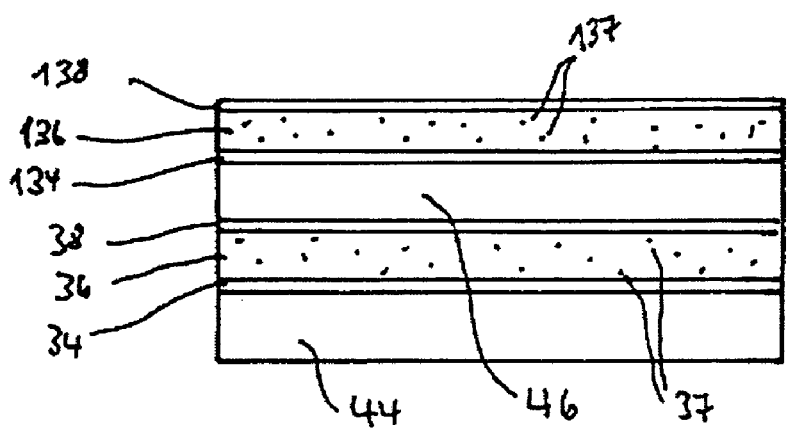
Figure 5:
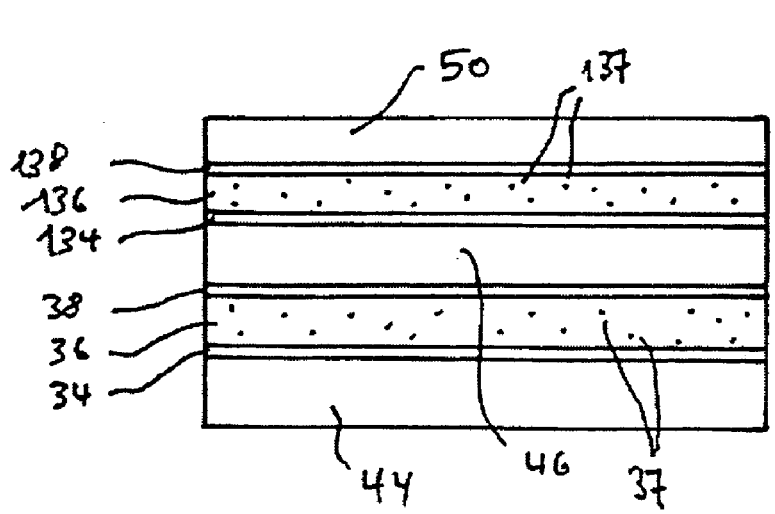
Figure 6:
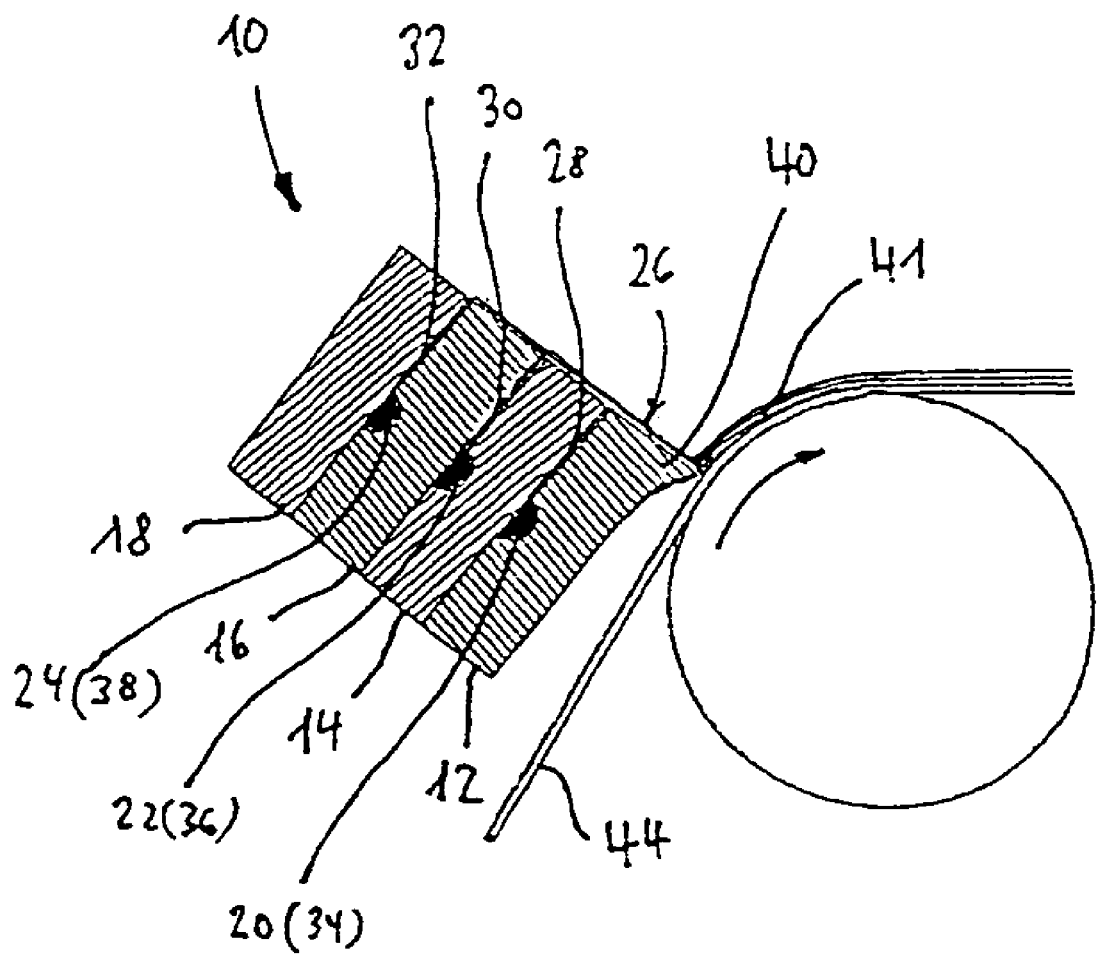

Further advantages, features and details of the invention are revealed in the following description of preferred exemplified embodiments and with the aid of the drawings which show schematically in:

FIG. 1 in cross-section, the process employed for joining two substrates using curtain coating;

FIG. 2 a cross-section through a detail of FIG. 1 along line I-I;

FIG. 3 a cross-section through a detail of FIG. 1 along line II-II;

FIG. 4 a cross-section through a detail of FIG. 1 along line III-III;

FIG. 5 a cross-section through a detail of FIG. 1 along line IV-IV;

FIG. 6 the slide-coating process as alternative to the curtain coating in FIG. 1, shown in cross-section.

Shown in FIG. 1 is a first nozzle arrangement 10 of a slide-coating device—not shown in detail here—for liquid film coating using curtain coating exhibiting four modules 12, 14, 16, 18 arranged in sequence. The modules 12, 14, 16, 18 together form three distribution chambers 20, 22, 24 lying transverse to the direction of movement x of the strip, each distribution chamber 20, 22, 24 having an outlet slit 28, 30, 32 ending at a nozzle slide-face 26. The distribution chambers 20, 22, 24 are supplied in the desired amount for distribution at the nozzle slide face 26, separately and in dosed quantities with coating fluid 34 (adhesive), 36 (intermediate layer), and 38 (adhesive)

The coating fluids 34, 36, 38 emerging from the distribution chambers 20, 22, 24 via slits 28, 30, 32 at the nozzle slide face 26 run as superimposed three-layer liquid film over an edge 40 on the module 12 and form a free-falling curtain 42. The middle layer of the coating fluid 30 contains a catalyst 37.

The three layer curtain 42 of coating fluids 34, 36, 38 makes contact essentially vertically with a first strip-shaped substrate 44 moving in direction x and forms the fluid coating on its surface, as shown in FIG. 2.

A second strip-shaped substrate 46 is fed in direction x to the first strip-shaped substrate 44 which is coated with the coating fluids 34, 36, 38 and adhesively bonded to the coated first strip-shaped substrate 44 to form a laminate 48 shown in FIG. 3.

Arranged in line with the first nozzle arrangement 10 is a second nozzle arrangement 110 which is in design identical to that of the first nozzle arrangement 10 and is for coating the laminate 48 further. The second nozzle arrangement 110 exhibits four modules 112, 114, 116, 118 one on top of the other. The series of modules 112, 114, 116, 118 forms in total three distribution chambers 120, 122, 124 transverse to the direction of strip movement x, each with an outlet slit 128, 130, 132 ending on a nozzle slide surface 126. The distribution chambers 120, 122, 124 are supplied at the nozzle slide surface in dosed amounts separately in accordance with the desired amount of coating fluids 134 (adhesive), 136 (intermediate layer), 138 (adhesive).

The coating fluids 134, 136, 138 emerging from the distribution chambers 120, 122, 124 via outlet slits 128, 130, 132 at the nozzle slide surface 126 as superimposed layers run as a three layer liquid film over an edge 140 on module 112 and form a free-falling curtain 142. The middle layer of coating fluid 136 contains a catalyst 137.

The three layer curtain 142 of coating fluids 134, 136, 138 makes contact essentially vertically with the first laminate 48 moving in direction x and forms on its surface the fluid coating shown in FIG. 4.

A third strip-shaped substrate 50 is fed in the direction of movement x to the laminate 48 coated with coating fluids 134, 136, 138 and adhesively bonded to the coated laminate 48 to form a further laminate 52 shown in FIG. 52.

Using the process shown in FIG. 1 it is possible to manufacture e.g. sterilizible pouches for packaging purposes. Such a pouch laminate comprises typically an outer film of polyethylene-terphthalate (PET) corresponding to the third substrate 50, possibly exhibiting a barrier layer of SiOx, and adhesively bonded to a further film of oriented polyamide (oPA). The oPA film corresponding to the second substrate 46 is bonded to a sealing film of polypropylene (PP) corresponding to the first substrate 44. In the conventional manufacture of the PET/oPA/PP laminate 52 aliphatic isocyanate adhesive adhesives are normally employed, the hardening time of which can be up to 12 days. Using the three layer adhesive system with catalyst according to the invention the hardening time is reduced to a fraction of the hardening time of conventional adhesives. The three layer adhesive system comprises e.g. two outer adhesive layers that are urethane-based and a urethane-based middle adhesive layer with Caprolactam as catalyst.

FIG. 6 shows a nozzle arrangement 10 with essentially the same set up as the nozzle arrangement in FIG. 1, whereby the run-off edge 40 is modified for slide coating. Here the three layer liquid film 41 slides from the run-off edge 40 directly onto the strip-shaped substrate 44 which directly passes the run-off edge 40.

The invention claimed is:

1. A process for manufacturing a laminate (48) made up of at least two film-shaped substrates (44, 46) bonded together by means of at least one adhesive layer containing a catalyst which accelerates hardening of the adhesive, comprising:
   curtain coating or slide-coating a first substrate (44) with a first liquid film comprising first and second adhesive layers (34, 38) and a first intermediate layer (36) situated between the first and second adhesive layers (34, 38), wherein the first intermediate layer contains a catalyst (37), and
   subsequently bonding the first substrate (44) onto a second substrate (46) to form a first laminate.

2. The process according to claim 1, further comprising:
   curtain coating or slide-coating the first laminate (48) with a second liquid film comprising third and fourth adhesive layers (134, 138) and a second intermediate layer (136) situated between the third and fourth adhesive layers (134, 138), wherein the second intermediate layer contains a catalyst (137), and
   subsequently bonding a third substrate (50) to the first laminate to form a second laminate (52).

3. The process according to claim 2, wherein each of the first, second, third, and fourth adhesive layers (34, 38, 134, 138) is functionally optimized with respect to a neighboring surface of the first, second, or third substrate (44, 46, 50).

4. The process according to claim 3, wherein the thickness of the first and second intermediate layers is greater than the thickness of each of the first, second, third, and fourth adhesive layers.

5. The process according to claim 4, wherein the thickness of each of the first, second, third, and fourth adhesive layers is 1 to 30 percent of the thickness of the first and second intermediate layers.

6. The process according to claim 5, wherein each of the first, second, third, and fourth adhesive layers (34, 38, 134, 138) comprises a polyurethane-based adhesive.

7. The process according to claim 6, wherein the first and second intermediate layers (36, 136) comprise a urethane-based adhesive.

8. The process according to claim 7, wherein the catalyst (37, 137) in the first and second intermediate layers (36, 136) is caprolactam.

9. The process according to claim 8, wherein each of the adhesive and intermediate layers (34, 36, 38; 134, 136, 138) in the first and second liquid films is solvent-based, solvent-free or water-based.

10. The process according to claim 9, wherein the first, second, and third substrates (44, 46, 50) are plastic films, metal foils, paper or a combination of at least two of the aforementioned materials.

11. The process according to claim 1, wherein each of the first and second adhesive layers (34, 38) is functionally optimized with respect to a neighboring surface of the first or second substrate (44, 46, 48).

12. The process according to claim 11, wherein the thickness of each of the first and second adhesive layers (34, 38) is less than thickness of the first intermediate layer (36).

13. The process according to claim 5, wherein the thickness of each of the first, second, third, and fourth adhesive layers is 1 to 10 percent of the thickness of the first and second intermediate layers.

14. The process according to claim 12, wherein the thickness of each of the first and second adhesive layers (34, 38) is 1 to 30 percent of the thickness of the first intermediate layer (36).

15. The process according to claim 12, wherein the thickness of each of the first and second adhesive layers (34, 38) is 1 to 10 percent of the thickness of the first intermediate layer (36).

16. The process according to claim 5, wherein each of the first, second, third, and fourth adhesive layers (34, 38, 134, 138) comprises a polyurethane-based or acrylic-based adhesive.

17. The process according to claim 1, wherein each of the first and second adhesive layers (34, 38) comprises a polyurethane-based adhesives adhesive or acrylic-based adhesive.

18. The process according to claim 6, wherein each of the first and second intermediate layers (36, 136) comprises a urethane-based adhesive with aromatic or aliphatic isocyanates.

19. The process according to claim 1, wherein the first intermediate layer (36) comprises a urethane-based adhesive.

20. The process according to claim 19, wherein the first intermediate layer (36) comprises a urethane-based adhesive with aromatic or aliphatic isocyanates.

21. The process according to claim 1, wherein the catalyst (37) in the first intermediate layer (36) is caprolactam.

22. The process according to claim 1, wherein each of the first and second adhesive layers and the first intermediate layer is solvent-based, solvent-free or water-based.

23. The process according to claim 1, wherein the first and second substrates (44, 46) are plastic films, metal foils, paper or a combination of at least two of the aforementioned materials.

* * * * *